(12) United States Patent
Roxbergh et al.

(10) Patent No.: US 11,690,059 B2
(45) Date of Patent: *Jun. 27, 2023

(54) CONFIGURATION OF TRANSMISSION ORDER OF UPLINK DATA

(71) Applicant: Telefonaktiebolaget LM Ericsson (publ), Stockholm (SE)

(72) Inventors: Jan Roxbergh, Sollentuna (SE); Jacob Österling, Järfälla (SE); Christer Östberg, Staffanstorp (SE); Henrik Ronkainen, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 168 days.

This patent is subject to a terminal disclaimer.

(21) Appl. No.: 17/168,668

(22) Filed: Feb. 5, 2021

(65) Prior Publication Data

US 2021/0160896 A1 May 27, 2021

Related U.S. Application Data

(63) Continuation of application No. 16/451,366, filed on Jun. 25, 2019, now Pat. No. 11,206,675, which is a
(Continued)

(30) Foreign Application Priority Data

Oct. 25, 2016 (WO) ................. PCT/SE2016/051035

(51) Int. Cl.
*H04W 72/12* (2023.01)
*H04W 88/08* (2009.01)
(Continued)

(52) U.S. Cl.
CPC .......... *H04W 72/12* (2013.01); *H04B 7/0617* (2013.01); *H04B 7/0639* (2013.01);
(Continued)

(58) Field of Classification Search
CPC ... H04W 72/12; H04W 28/12; H04W 72/042; H84W 88/885; H04L 5/0053
See application file for complete search history.

(56) References Cited

U.S. PATENT DOCUMENTS 6,618,397 B1  9/2003  Huang
10,368,362 B2  7/2019  Roxbergh et al.
(Continued)

FOREIGN PATENT DOCUMENTS

EP  0843494 A2  5/1998
EP  1827035 B1  7/2009
(Continued)

OTHER PUBLICATIONS

Dragan Samardzija, John Pastalan, Michael MacDonald, Susan Walker and Reinaldo Valenzuela, "Compressed Transport of Baseband Signals in Radio Access Networks," IEEE Transactions on Wireless Communications, vol. 11, No. 9, Sep. 2012, pp. 3216-3225.
(Continued)

*Primary Examiner* — Benjamin H Elliott, IV
(74) *Attorney, Agent, or Firm* — Sage Patent Group (57) ABSTRACT

A method for configuring transmission order of uplink data, the method performed by a radio equipment ("RE") of an access node. The RE has a RE controller ("REC")-RE interface that communicatively couples the RE with a REC of the access node. The method includes receiving instructions from the REC that indicate a scheduling prioritization for transmission by the RE of uplink data between the RE and the REC over the REC-RE interface. The uplink data can be received by the RE on the radio interface. The method can further include transmitting the uplink data on the REC-RE interface according to the instructions, resulting in the scheduling prioritization of the uplink data.

20 Claims, 6 Drawing Sheets

Related U.S. Application Data continuation of application No. 15/523,794, filed as application No. PCT/SE2017/050217 on Mar. 8, 2017, now Pat. No. 10,368,362.

(51) Int. Cl.

| | | |
|---|---|---|
| *H04B 7/06* | (2006.01) | |
| *H04W 16/28* | (2009.01) | |
| *H04W 72/044* | (2023.01) | |
| *H04L 5/00* | (2006.01) | |
| *H04W 28/00* | (2009.01) | |
| *H04W 28/12* | (2009.01) | |
| *H04W 72/23* | (2023.01) | |
| *H04W 72/1268* | (2023.01) | |
| *H04L 27/26* | (2006.01) | |

(52) U.S. Cl.
CPC ............ *H04L 5/003* (2013.01); *H04L 5/0044* (2013.01); *H04L 5/0048* (2013.01); *H04L 5/0053* (2013.01); *H04L 5/0057* (2013.01); *H04L 27/2601* (2013.01); *H04W 16/28* (2013.01); *H04W 28/00* (2013.01); *H04W 28/12* (2013.01); *H04W 72/046* (2013.01); *H04W 72/1268* (2013.01); *H04W 72/23* (2023.01); *H04W 88/085* (2013.01); *H04L 27/26* (2013.01)

(56) References Cited

U.S. PATENT DOCUMENTS

| | | | |
|---|---|---|---|
| 11,206,675 | B2* | 12/2021 | Roxbergh .......... H04L 27/2601 |
| 2005/0220116 | A1 | 10/2005 | Ahn et al. |
| 2007/0072646 | A1 | 3/2007 | Kuwahara et al. |
| 2009/0239477 | A1* | 9/2009 | Yamamoto .............. H04W 8/26 455/68 |
| 2010/0074121 | A1 | 3/2010 | Sakama |
| 2010/0075678 | A1 | 3/2010 | Akman et al. |
| 2010/0136932 | A1 | 6/2010 | Osterling et al. |
| 2010/0220679 | A1 | 9/2010 | Abraham et al. |
| 2010/0273498 | A1 | 10/2010 | Kim et al. |
| 2011/0014908 | A1 | 1/2011 | Eiza et al. |
| 2011/0199921 | A1 | 8/2011 | Damnjanovic et al. |
| 2011/0243071 | A1 | 10/2011 | Wu et al. |
| 2012/0057548 | A1 | 3/2012 | Hasegawa |
| 2012/0300710 | A1 | 11/2012 | Zheng et al. |
| 2013/0272213 | A1 | 10/2013 | Manssour |
| 2013/0294419 | A1 | 11/2013 | Heiser et al. |
| 2014/0079018 | A1 | 3/2014 | Seo et al. |
| 2014/0119312 | A1 | 5/2014 | Doetsch et al. |
| 2015/0029965 | A1 | 1/2015 | Aminaka et al. |
| 2015/0103655 | A1 | 4/2015 | Yu |
| 2016/0227555 | A1 | 8/2016 | Haberland et al. |
| 2017/0373890 | A1 | 12/2017 | Fertonani et al. |
| 2018/0054214 | A1 | 2/2018 | Takahashi |
| 2018/0242349 | A1 | 8/2018 | Noh et al. |
| 2018/0317238 | A1* | 11/2018 | Roxbergh ........... H04L 27/2601 |
| 2019/0313425 | A1 | 10/2019 | Roxbergh et al. |
| 2019/0313428 | A1* | 10/2019 | Zhou .................. H04L 27/2657 |
| 2021/0160896 | A1* | 5/2021 | Roxbergh ............. H04L 5/0044 |

FOREIGN PATENT DOCUMENTS

| | | | |
|---|---|---|---|
| EP | 2515590 | A1 | 10/2012 |
| EP | 2515603 | A2 | 10/2012 |
| EP | 2685755 | A1 | 1/2014 |
| EP | 2739105 | A1 | 6/2014 |
| EP | 2911331 | B1 | 12/2018 |
| EP | 2785099 | B1 | 5/2019 |
| JP | 2010-074594 | A | 4/2010 |
| JP | 2010-239307 | A | 10/2010 |
| JP | 2014-515584 | A | 6/2014 |
| JP | 2016-532403 | A | 10/2016 |
| TW | 201304448 | A | 1/2013 |
| WO | 2015197102 | A1 | 12/2015 |
| WO | 2015197104 | A1 | 12/2015 |
| WO | 2016039839 | A1 | 3/2016 |
| WO | 2016195555 | A1 | 12/2016 |
| WO | 2016195556 | A1 | 12/2016 |
| WO | 2018093301 | A1 | 5/2018 |

OTHER PUBLICATIONS

Notice of Reasons for Rejection, including English translation, for Japanese Patent Application No. 2019-520994 dated Jun. 16, 2020, 6 pages.
Zte et al., High level views on beam management for NR-MIMO, 3GPP TSG RAN WG1 Meeting #88, R1-1701797, Athens, Greece, Feb. 13-17, 2017.
De la Oliva, et al., An Overview of the CPRI Specification and Its Application to C-RAN-Based LTE Scenarios, IEEE Communications Magazine, vol. 54, No. 2, pp. 152-159, Feb. 2016.

* cited by examiner

CONFIGURATION OF TRANSMISSION ORDER OF UPLINK DATA

CROSS REFERENCE TO RELATED APPLICATIONS

This application is a continuation of U.S. patent application Ser. No. 16/451,366 titled "Configuration of Transmission Order of Uplink Data," filed Jun. 25, 2019, which is a continuation of U.S. patent application Ser. No. 15/523,794, filed May 2, 2017 (now U.S. Pat. No. 10,368,362), which is a 371 of International Application No. PCT/SE2017/050217, filed Mar. 8, 2017, and claims priority to International Application No. PCT/SE2016/051035 filed Oct. 25, 2016, the disclosures of which are fully incorporated herein by reference.

TECHNICAL FIELD

Embodiments presented herein relate to a method, a radio equipment controller, a computer program, and a computer program product for configuring transmission order of uplink data. Embodiments presented herein further relate to a method, a radio equipment, a computer program, and a computer program product for prioritized transmission of uplink data.

BACKGROUND

In communications systems, there may be a challenge to obtain good performance and capacity for a given communications protocol, its parameters and the physical environment in which the communications system is deployed.

For example, the introduction of digital beamforming antenna systems in access nodes, such as radio base stations, etc., could allow multiple simultaneous narrow beams to be used to provide network access to, and thus serve, multiple simultaneous terminal devices, such as user equipment (UE), etc. However, the current split in the access nodes between a radio equipment controller (REC) and a radio equipment (RE) as interconnected by the Common Public Radio Interface (CPRI) may no longer be feasible as passing the data for each individual radio chain over the CPRI interface could drive prohibitively high data rates.

In more detail, the bit rate of the current CPRI interface scales directly to the number of independent radio chains in the RE. When having e.g., a 200 MHz carrier bandwidth and 128 physical antenna elements in the beamforming antenna system, a bit rate of 530 Gbps would be needed for the CPRI interface with currently used sample rate and sample bit width. A further potential drawback with CPRI is the extra latency from uplink (UL; from terminal device to access node) sampling to the time the data can be used in downlink (DL; from access node to terminal device), as any information based on sampled data needs to be looped back from REC if to be used in RE.

One way to address the above-mentioned issues is to collapse the CPRI based architecture by removing the CPRI interface and putting the functionality of the REC in the RE. This approach has at least two drawbacks. Firstly, due to faster technological development of the REC compared to the RE, the technical lifetime of the REC is assumed to be shorter than that of the RE. Replacing the RE is more costly than replacing the REC. From this aspect it could thus be beneficial to keep the functionality of the RE as simple as possible. Secondly, the REC could be configured to make decisions spanning over multiple REs in order to make coordinated multi-sector decisions, e.g. when some REs represent coverage regions of the access node within the coverage regions of other REs (e.g. a so-called micro cell within a so-called macro cell). A collapsed architecture loses this overarching coordination possibility.

Hence, there is a need for an improved communication between the REC and the RE.

SUMMARY

An object of embodiments herein is to enable efficient communication between the REC and the RE.

According to a first aspect there is presented a method for configuring transmission order of uplink data. The method is performed by an REC of an access node. The REC has an interface to an RE of the access node. The method comprises providing instructions to the RE how to prioritize transmission order of uplink data. The uplink data is received by the RE on a radio interface and is to be transmitted from the RE to the REC on the interface. The REC thereby configures the transmission order.

According to a second aspect there is presented an REC of an access node for configuring transmission order of uplink data. The REC has an interface to an RE of the access node and comprises processing circuitry. The processing circuitry is configured to cause the REC to provide instructions to the RE how to prioritize transmission order of uplink data. The uplink data is received by the RE on a radio interface and is to be transmitted from the RE to the REC on the interface. The REC thereby configures the transmission order.

According to a third aspect there is presented an REC of an access node for configuring transmission order of uplink data. The REC has an interface to an RE of the access node. The REC comprises processing circuitry and a storage medium. The storage medium stores instructions that, when executed by the processing circuitry, cause the REC to provide instructions to the RE how to prioritize transmission order of uplink data. The uplink data is received by the RE on a radio interface and is to be transmitted from the RE to the REC on the interface. The REC thereby configures the transmission order.

According to a fourth aspect there is presented an REC of an access node for configuring transmission order of uplink data. The REC has an interface to an RE of the access node. The REC comprises a provide module configured to provide instructions to the RE how to prioritize transmission order of uplink data. The uplink data is received by the RE on a radio interface and is to be transmitted from the RE to the REC on the interface. The REC thereby configures the transmission order.

According to a fifth aspect there is presented a computer program for configuring transmission order of uplink data. The computer program comprises computer program code which, when run on processing circuitry of an REC of an access node having an interface to an RE of the access node, causes the REC to perform a method according to the first aspect.

According to a sixth aspect there is presented a method for prioritized transmission of uplink data. The method is performed by an RE of an access node. The RE has an interface to an REC of the access node. The method comprises receiving instructions from the REC how to prioritize transmission order of uplink data. The uplink data is received by the RE on a radio interface and is to be transmitted from the RE to the REC on the interface. The method comprises transmitting the uplink data on the interface according to the instructions, resulting in prioritized transmission of the uplink data.

According to a seventh aspect there is presented an RE of an access node for prioritized transmission of uplink data. The RE has an interface to an REC of the access node and comprises processing circuitry. The processing circuitry is configured to cause the RE to receive instructions from the REC how to prioritize transmission order of uplink data. The uplink data is received by the RE on a radio interface and is to be transmitted from the RE to the REC on the interface. The processing circuitry is configured to cause the RE to transmit the uplink data on the interface according to the instructions, resulting in prioritized transmission of the uplink data.

According to an eighth aspect there is presented an RE of an access node for prioritized transmission of uplink data. The RE has an interface to an REC of the access node. The RE comprises processing circuitry and a storage medium. The storage medium stores instructions that, when executed by the processing circuitry, cause the RE to perform operations, or steps. The operations, or steps, cause the RE to receive instructions from the REC how to prioritize transmission order of uplink data. The uplink data is received by the RE on a radio interface and is to be transmitted from the RE to the REC on the interface. The operations, or steps, cause the RE to transmit the uplink data on the interface according to the instructions, resulting in prioritized transmission of the uplink data.

According to a ninth aspect there is presented an RE of an access node for prioritized transmission of uplink data. The RE has an interface to an REC of the access node. The RE comprises a receive module configured to receive instructions from the REC how to prioritize transmission order of uplink data. The uplink data is received by the RE on a radio interface and is to be transmitted from the RE to the REC on the interface. The RE comprises a transmit module configured to transmit the uplink data on the interface according to the instructions, resulting in prioritized transmission of the uplink data.

According to a tenth aspect there is presented a computer program for prioritized transmission of uplink data, the computer program comprising computer program code which, when run on processing circuitry of an RE of an access node having an interface to an REC of the access node, causes the RE to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these RECs, these REs, and these computer programs allows for efficient communication between the REC and the RE.

Advantageously these methods, these RECs, these REs, and these computer programs enable the REC to configure the RE (and the RE to be configured by the REC) as needed. The RE does therefore not need to be pre-configured to use a certain prioritization mode. That is, the REC instructs the RE not only to prioritize the transmission order of the uplink data as such, but the REC instructs the RE how the prioritization is to be performed, thereby enabling flexible configuration of the RE.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
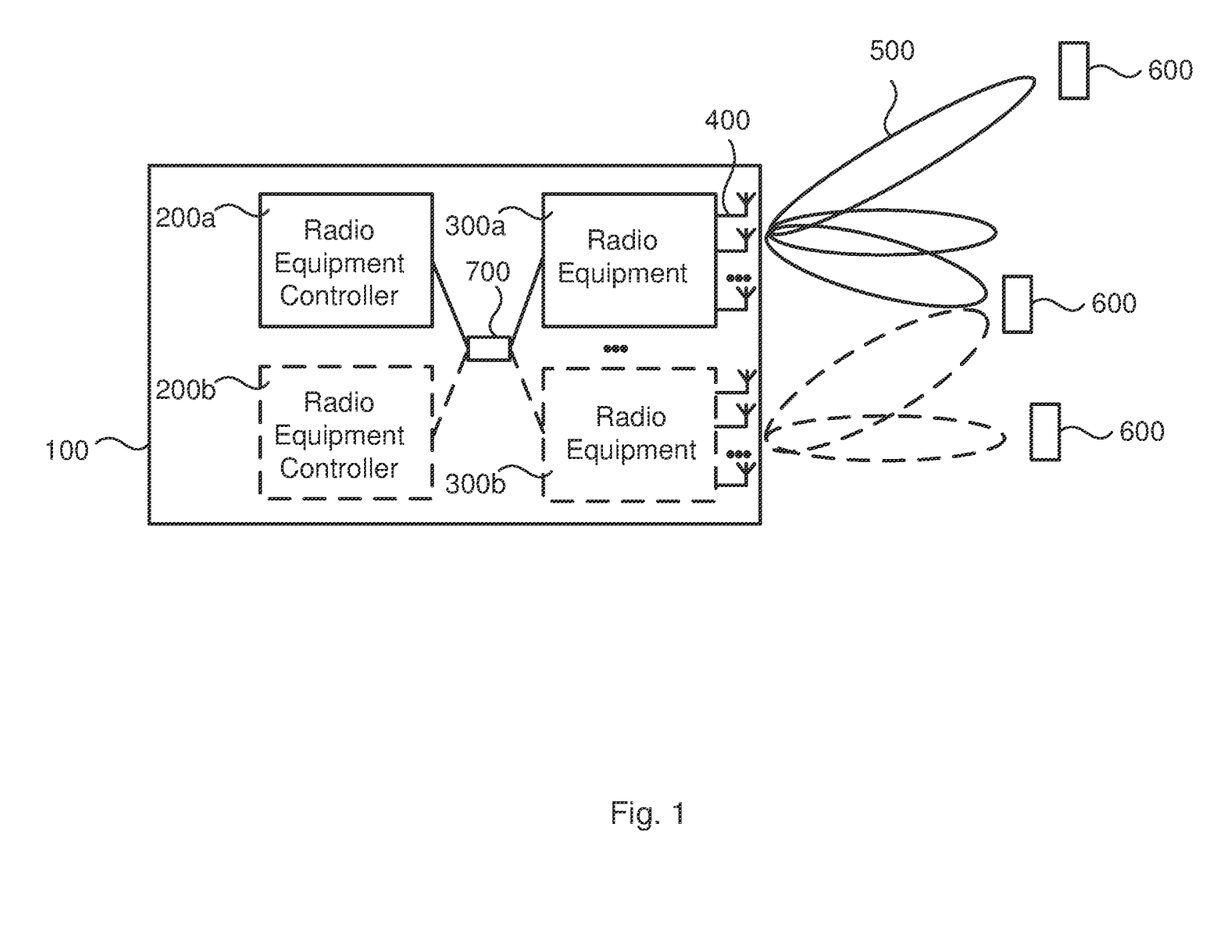
FIG. 1 is a schematic diagram illustrating an access node according to embodiments.

FIG. 1 is a schematic diagram illustrating an access node 100 where embodiments presented herein can be applied. The access node could be a radio base station such as a radio access network node, base transceiver station, node B, evolved node B, or access point. As disclosed above, the access node comprises at least one Radio Equipment Controller (REC) 200*a*, 200*b* and at least one Radio Equipment (RE) 300*a*, 300*b*. In the illustrative example of FIG. 1 the access node comprises two RECs and two REs, where each REC has an interface 700 to the REs; the interface 700 will hereinafter be denoted an REC-RE interface 700. Preferably, the REC-RE interface 700 is a wired interface, e.g. using optical fiber communications. However, alternatively the REC-RE interface 700 is a wireless interface, e.g. using radio communications. Further properties of the REC-RE interface 700 between the REC and the RE will be disclosed below. The REs are configured to perform DL transmissions to, and UL receptions from, terminal devices 600 in beams 500 by using appropriate beamforming weights at the antennas of the radio interface 400 at the RE. The beamforming weights define at least the pointing direction and the width of the beams.

The REC-RE interface 700 between REC 200*a*, 200*b* and RE 300*a*, 300*b* could be a packet-based interface, and hence not a streaming interface. This allows for quick and flexible allocation of resources on the REC-RE interface 700 to different terminal devices 600. The REC is configured to maintain knowledge about the terminal devices, and schedules the air interface between the access node and the terminal devices. The RE is configured to act on commands received from the REC.

As an illustrative example, consider a communications system having an air interface with a system bandwidth of 400 MHz and that provides support for 4 MIMO streams and utilizes access nodes with 64 antennas for beamforming. Using CPRI interfaces between the REC and the RE exposing all 64 antennas for the REC would require approximately 54 CPRI interfaces of 10 Gbps, since a CPRI interface carries about 480 MHz. Further, an interface using virtual antenna ports would require 4 MIMO streams of 400 MHz, and would require about 4 CPRI interfaces of 10 Gbps, since one 10 Gbps CPRI interface still carries data for about 480 MHz. By also moving the modulation DL to the RE, the 4 MIMO streams of 400 MHz would require 7 Gbps (assuming 256QAM and 20 LTE 20 MHz carriers), or one 10 Gbps CPRI interface. A higher bitrate of the CPRI interface is required in the UL if the whole system bandwidth is used, as demodulation is still performed in the REC.

A general aspect of the inventive concepts disclosed herein is to maximize the utilization of the REC-RE interface 700 between the REC 200*a*, 200*b* and the RE 300*a*, 300*b*, both in the case where there is only one REC 200*a* and when there are multiple RECs 200*a*, 200*b* sharing the REC-RE interface 700 (or segments of the REC-RE interface 700).

The embodiments disclosed herein thus relate to mechanisms for configuring transmission order of uplink data and prioritized transmission of uplink data. Unless otherwise stated the uplink data refers to data transferred from the RE 300*a* to the REC 200 on the REC-RE interface 700. Such uplink data could represent raw data as received on the radio interface 400 at the RE 300*a* and forwarded by the RE 300*a* to the REC 200*a*. Alternatively, such uplink data could represent refined data as determined by the RE 300*a*, where the refined data is based on raw data as received on the radio interface 400, and where the RE 300*a* processes the raw data in order to determine the refined data. That is, the refined data is determined from the raw data. One non-limiting example of raw data is in-phase and quadrature (IQ) constellation points. One example of refined data is channel estimate values.

In order to obtain such mechanisms there is provided an REC 200, a method performed by the REC 200, a computer program product comprising code, for example in the form of a computer program, that when run on processing circuitry of the REC 200, causes the REC 200*a* to perform the method. In order to obtain such mechanisms there is further provided an RE 300*a*, 300*b*, a method performed by the RE 300*a*, 300*b*, and a computer program product comprising code, for example in the form of a computer program, that when run on processing circuitry of the RE 300*a*, 300*b*, causes the RE 300*a*, 300*b* to perform the method.

Figure 2:
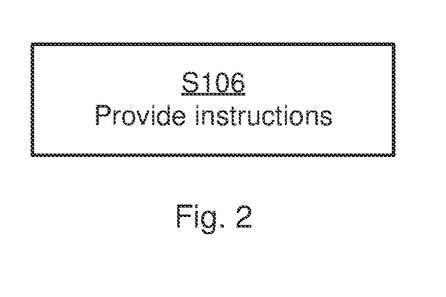
FIGS. 2, 3, 4, and 5 are flowcharts of methods according to embodiments.
Figure 3:
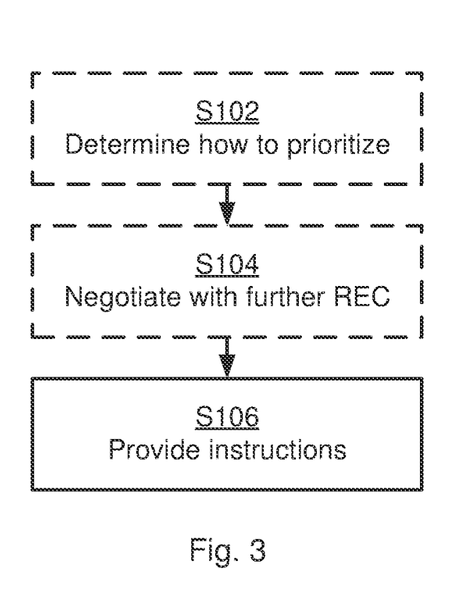
Figure 4:
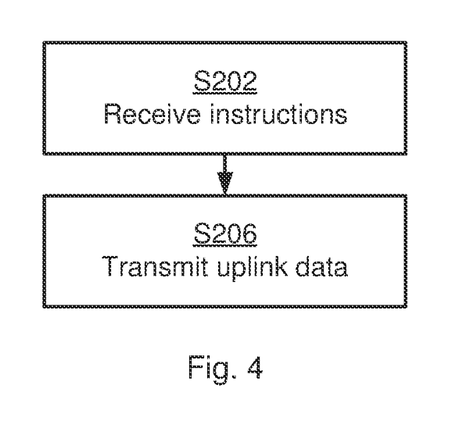
Figure 5:
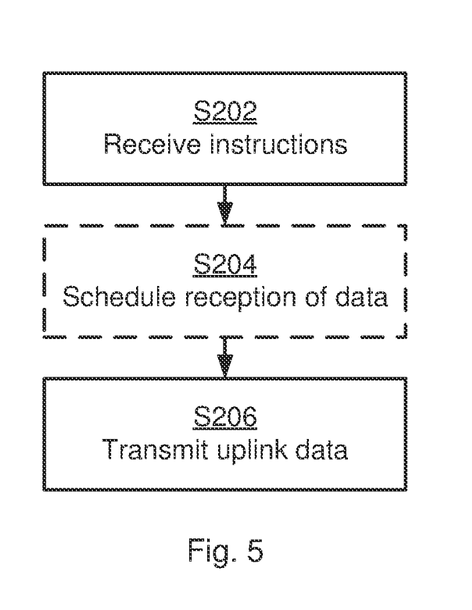

FIGS. 2 and 3 are flowcharts illustrating embodiments of methods for configuring transmission order of uplink data as performed by the REC 200*a*. FIGS. 4 and 5 are flowcharts illustrating embodiments of methods for prioritized transmission of uplink data as performed by the RE 300*a*, 300*b*. The methods are advantageously provided as computer programs 1320*a*, 1320*b*.

Reference is now made to FIG. 2 illustrating a method for configuring transmission order of uplink data as performed by the REC 200*a* of the access node 100 according to an embodiment. The REC 200*a* has an REC-RE interface 700 to an RE 300*a*, 300*b* of the access node 100.

The REC 200*a* configures the RE 300*a*, 300*b* in terms of prioritized transmission of uplink data. Particularly, the REC 200*a* is configured to perform step S106:

S106: The REC 200*a* provides instructions to the RE 300*a*, 300*b* how to prioritize transmission order of uplink data. The uplink data is received by the RE 300*a*, 300*b* on a radio interface 400 and is to be transmitted from the RE 300*a*, 300*b* to the REC 200*a* on the REC-RE interface 700. The REC 200*a* thereby configures the transmission order (of the uplink data).

This enables the REC 200 to configure the RE 300*a*, 300*b* as needed. The RE 300*a*, 300*b* does therefore not need to be pre-configured to use a certain prioritization mode. That is, the REC 200*a* instructs the RE 300*a*, 300*b* not only to prioritize the transmission order of the uplink data as such, but the REC 200*a* instructs the RE 300*a*, 300*b* how the prioritization is to be performed, thereby enabling flexible configuration of the RE 300*a*, 300*b*.

Embodiments relating to further details of configuring transmission order of uplink data as performed by the REC 200*a* will now be disclosed.

Reference is now made to FIG. 3 illustrating methods for configuring transmission order of uplink data as performed by the REC 200*a* according to further embodiments. It is assumed that step S106 is performed as described above with reference to FIG. 2 and a thus repeated description thereof is therefore omitted.

In some aspects the REC 200*a* determines the prioritization (i.e., how the transmission of the uplink data is to be prioritized) before providing instructions to the RE 300*a*, 300*b*. Hence, according to an embodiment the REC 200*a* is configured to perform step S102:

S102: The REC 200*a* determines how the RE 300*a*, 300*b* is to prioritize the transmission order of the uplink data.

The determination could be based on factors as will be given below.

In some aspects the prioritization is determined such that samples are received in order to be processed at baseband. Hence, according to an embodiment the transmission order is prioritized such that the uplink data is received by the REC 200*a* in the order to be processed at baseband. This allows the REC-RE interface 700 to be temporarily over-utilized; the REC 200*a* controls the prioritization of the samples sent from the RE in the UL to ensure that the samples are received in the order they are going to be processed at baseband. This cuts over-all latency.

In scenarios where a single REC 200a is operatively connected to one or more REs 300a, 300b the REC 200a may directly configure this one or more REs 300a, 300b. However, there might be scenarios where two or more RECs 200a, 200b share one or more REs 300a, 300b.

That is, different RECs 200a, 200b might share the same RE 300a and/or the REC-RE interface 700. An option would be to have a fixed allocation of the REC-RE interface 700 for each of the RECs 200a, 200b to act within. Another approach is to have the RECs 200a, 200b negotiate for each subframe, or similar, on the best usage of the shared resources (as defined by one or more REs 300a, 300b and/or the REC-RE interface 700). The RECs 200a, 200b might therefore coordinate and adjust the traffic through the one or more RE 300a, 300b to fit into the available traffic capacity over the common REC-RE interface 700. In more detail, to handle scenarios with several RECs 200a, 200b, there might be a coordinating function within the RECs 200a, 200b communicating with its neighboring RECs 200a, 200b, negotiating the use of the available capacity of the REC-RE interface 700. In some aspects the REC 200a thus negotiates with at least one other REC 200b in conjunction with determining how to prioritize the transmission order of the uplink data on the REC-RE interface 700. The negotiation could comprise exchanging information with this at least one other REC 200b. Hence, according to an embodiment the REC 200a is operatively connected to a further REC 200b that shares the REC-RE interface 700 to the RE 300a, 300b with the REC 200a. The REC 200a could then be configured to perform step S104:

S104: The REC 200a negotiates with the further REC 200b how to prioritize the transmission order of the uplink data to be transmitted from the RE 300a, 300b to the REC 200a. The REC 200a could further negotiate with the further REC 200b how to prioritize transmission order of uplink data to be transmitted from the RE 300a, 300b to the further REC 200b.

Such an exchange of planned usage between the RECs 200a, 200b could avoid over-head (such as over-provisioning resulting from allocation of additional bandwidth) that otherwise would be needed to be reserved due to unknown peaks in other REC usage. The RECs 200a, 200b sharing the same RE 300a, 300b or sharing the REC-RE interface 700 can exchange information on their proposed usage, and negotiate a fair split of capacity.

The sharing between the RECs 200a, 200b of the REC-RE interface 700 can be done both by rate limiting on the transmitting side but also by sharing the REC-RE interface 700 in the time domain. A common priority setting among the scheduled transmissions (UL or DL) can be used to aid in determining when to transmit but also to support intermediate nodes on the link the preserve the relative priority. As an example, each REC 200a, 200b could be configured to make a best case scheduling of uplink transmission on the REC-RE interface 700 where it can assume having all resources on the REC-RE interface 700. The scheduling decision is shared with other RECs 200a, 200b to coordinate with, and a joint prioritization can be made. Each REC 200a, 200b then yields to the common prioritization. If the coordination is not done in time, one or more RECs 200a, 200b could back off to a guaranteed portion of the REC-RE interface 700, e.g. an equal share.

Further, how to prioritize the transmission order is in some aspects based on requirements for maintaining a service for served terminal devices 600. As an example, terminal devices 600 with strict decoding latency requirements (due to such service) could be given a comparatively high priority. Hence, according to an embodiment, how to prioritize the transmission order is based on a criterion for maintaining a service associated with the uplink data.

In general terms, the data communication from the RE 300a, 300b to the REC 200a is bursty. Most relevant data originates from the UL time slots on the radio interface 400. The UL timeslots typically occupy ⅕ of the total time of the transfer of data from the REC 200a to the RE 300a over the REC-RE interface 700; the remaining ⅘ of the total time is occupied by DL timeslots. Significant cost savings can thus be made on the REC-RE interface 700 if the UL related data is spread out over a time span longer than that of the UL timeslot duration.

In some aspects, UL user data is prioritized higher than UL measurement data. As an example, UL measurement data (such as channel estimation or refined channel estimations (delta information)) could be prioritized lower than UL user data. In other aspects UL user data is prioritized lower than UL measurement data. As an example, transmission of demodulation reference symbols could be given a comparatively high priority. Hence, according to an embodiment the uplink data comprises user data and measurement data, and the RE 300a, 300b is instructed by the RE 200a to prioritize transmission of the user data higher than transmission of the measurement data, or vice versa.

In some aspects, measurement data for non-stationary channels is prioritized higher than measurement data for stationary channels. Hence, according to an embodiment the uplink data comprises first measurement data of a first radio propagation channel and second measurement data of a second radio propagation channel, where the first radio propagation channel is more non-stationary than the second radio propagation channel. The RE 300a, 300b is then by the REC 200a in step S106 instructed to prioritize transmission of the first measurement data higher than transmission of the second measurement data.

In some aspects, the prioritization is made per user, per beam, and/or per symbol. The symbols could be reference symbols. Hence, according to an embodiment the instructions pertain to at least one of prioritization per terminal device 600 from which the uplink data is received by the RE 300a, 300b, prioritization per beam 500 in which the uplink data is received by the RE 300a, 300b, and prioritization per symbol in the uplink data. In terms of priority per user (or terminal device 600), some users are more latency critical than others and symbols for the latency critical users could be sent first. In terms of priority per beam 500, different beams 500 of the same user could be given different priority. In contrast, commonly, excessively many beams 500 are ordered by the REC 200a. Demodulation and decoding can start on a subset of the beams 500 if latency prohibits waiting for all beams 500 to be transferred. In terms of priority per symbol, for any beam 500, the demodulation reference symbols could be given priority over normal data symbols, as the demodulation reference symbols in some respects are needed earlier in the signal processing chain in the REC 200a.

There could be different ways for the REC 200a, to set the priorities (i.e., different ways for the REC 200a to provide the instructions to the RE 300a, 300b in step s106 how to prioritize transmission order of uplink data). In some aspects the priorities are set by the REC 200a in an UL control message (for a certain symbol or reception time slot). Hence, according to an embodiment the instructions in step S106 are provided in an uplink control message.

Figure 6:
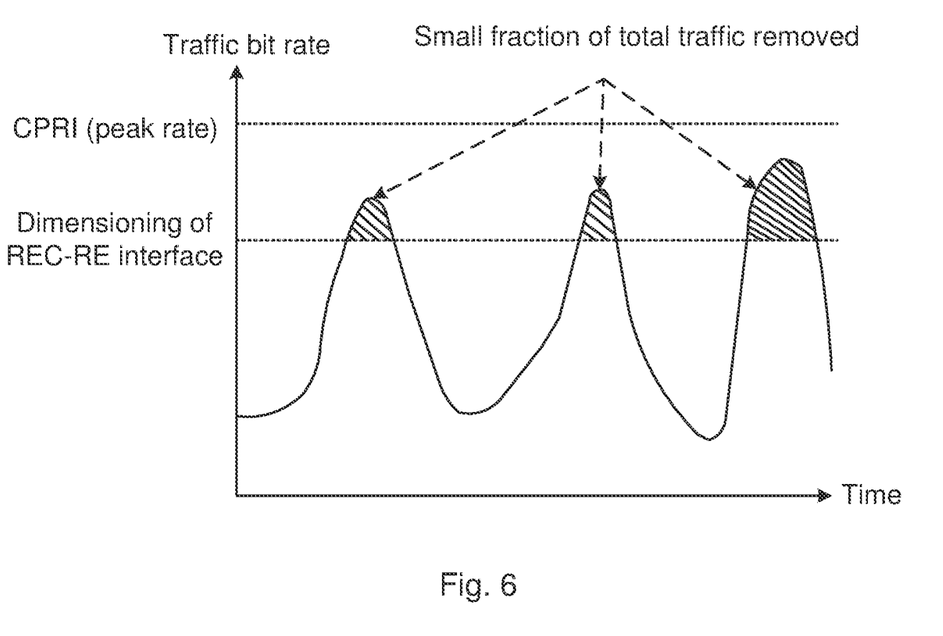
FIG. 6 is a schematic illustration of downlink traffic bit rate as a function of time according to embodiments.

In general terms, the REC-RE interface 700 carries user data symbols associated with terminal devices 600 and the bit rate will thus, among other things, depend on the number of terminal devices 600 currently being served by the access node 100 and on the amount of data that is received and transmitted to each served terminal devices 600. The CPRI interface used today must be dimensioned according to the peak rate requirements independently of how it is actually used. This is illustrated in FIG. 6. FIG. 6 gives an illustrative example of the traffic bit rate at the radio interface 400 of the RE 300*a* as a function of time. The REC-RE interface 700 could have a statistical dimensioning, i.e. where the REC-RE interface 700 is not dimensioned according to the peak capacity. Hence, according to an embodiment, the REC-RE interface 700 has lower bit rate capacity for transmission of the uplink data than a peak bit rate at which the uplink data is received at the RE 300*a*, 300*b*.

If a non-peak dimensioning is used it may happen that temporarily there are many served terminal devices 600 requiring a temporary high capacity of the REC-RE interface 700. In such a case user data packets will be dropped on the REC-RE interface 700, resulting in retransmission over the radio interface 400 to the terminal devices 600, thus wasting radio resources. This is also illustrated in FIG. 6. Therefore, according to an embodiment the instructions comprises a prioritization command relating to scheduling of the reception of the uplink data from terminal devices 600, where the prioritization commands are to be applied at the RE 300*a*, 300*b* during reception of the uplink data. The RE 300*a*, 300*b* can thereby be aware of the limitations of the REC-RE interface 700 and be configured to adjust the amount of data that is scheduled over the radio interface 400 to fit into the available capacity of the REC-RE interface 700. That is, the scheduler of the radio interface 400 could be aware of the capacity of the REC-RE interface 700 and adjust the amount of data that is scheduled over the radio interface 400 to fit into the available capacity of the REC-RE interface 700. That is, according to an embodiment the prioritization commands is based on the bit rate capacity of the REC-RE interface 700. The prioritization command could be applicable to different types of data. Some examples of such data are user data symbols, such as data on a physical downlink shared channel (PDSCH) and data on a physical uplink shared channel (PUSCH), beam weights for the beamforming function in the RE 300*a*, 300*b* and reference signals such as sounding reference signals (SRS) or reciprocity reference signals (RRS) for spatial observation of the terminal devices 600. Hence, according to an embodiment the prioritization command relates to reception of uplink data comprising at least one of user data symbols, channel estimates, and reference symbols.

According to an embodiment the prioritization command relates to at least one of the number of terminal devices 600 to be scheduled, the number of layers to be scheduled for each terminal device 600 in downlink, the number of beams 500 to be scheduled for reception in the uplink, the amount of time/frequency resources to be available for reception of uplink data and transmission of downlink data, and adaptation of resolution in frequency of the time/frequency resources. Further aspects relating thereto will be disclosed below with reference to the RE 300*a*, 300*b*.

There could be different ways for how often the instructions in step s106 are provided, or for how large amount of uplink data the instructions are applicable. In an embodiment the instructions how the RE 300*a*, 300*b* is to prioritize received uplink data are provided to the RE 300*a*, 300*b* per transmission time interval (TTI) of the uplink data. That is, according to this embodiment the instructions are thus valid for one TTI. In this respect, the TTI is defined by the TTI of the transmission and reception of the radio interface 400 of the RE 300*a*, 300*b*.

In summary, by having the REC 200*a*, 200*b* being aware of the capacity of the REC-RE interface 700 and enabled to prioritize how uplink data is to be transmitted on the REC-RE interface 700, the usage of the REC-RE interface 700 can be optimized. An optimal use of the REC-RE interface 700 could be made by, at each scheduling interval, prioritize how uplink data is to be transmitted on the REC-RE interface 700 according to the limitations of the REC-RE interface 700, where the prioritization pertains to adjustment of the resolution in time and/or frequency for weight information, number of terminal devices 600, beams 600 and layers. Further, in scenarios with two or more RECs 200*a*, 200*b*, each REC 200*a*, 200*b* could be configured to coordinate the usage of the REC-RE interface 700 with its neighbors in order to optimize the usage of the REC-RE interface 700. An optimal use of the REC-RE interface 700 could then be made by, at each scheduling interval, coordinate the scheduling among RECs 200*a*, 200*b* at each scheduling interval so as to prioritize how uplink data is to be transmitted on the REC-RE interface 700 according to the limitations of the REC-RE interface 700, where the prioritization pertains to adjustment of the resolution in time and/or frequency for weight information, number of terminal devices 600, beams 600 and layers.

Reference is now made to FIG. 4 illustrating a method for prioritized transmission of uplink data as performed by the RE 300*a* of the access node 100 according to an embodiment. The RE 300*a* has an REC-RE interface 700 to the REC 200*a* of the access node 100.

As disclosed above, the REC 200*a* in step S106 provides instructions to the RE 300*a* how to prioritize the transmission order of uplink data on the REC-RE interface 700. It is assumed that these instructions are received by the RE 300*a*. Hence, the RE 300*a* is configured to perform step S202:

S202: The RE 300*a* receives instructions from the REC 200*a* how to prioritize transmission order of uplink data. The uplink data is received by the RE 300*a*, 300*b* on a radio interface 400 and is to be transmitted from the RE 300*a*, 300*b* to the REC 200*a* on the REC-RE interface 700.

The RE 300*a* then acts accordingly and is hence configured to perform step S206:

S206: The RE 300*a* transmits the uplink data on the REC-RE interface 700 according to the instructions, resulting in prioritized transmission of the uplink data. The uplink data is thus transmitted on the interface in an order as given by the instructions provided by the REC 200*a*.

Embodiments relating to further details of prioritized transmission of uplink data as performed by the RE 300*a*, 300*b* will now be disclosed.

As disclosed above, according to an embodiment the prioritization command relates to at least one of the number of terminal devices 600 to be scheduled, the number of layers to be scheduled for each terminal device 600 in downlink, the number of beams 500 to be scheduled for reception in the uplink, the amount of time/frequency resources to be available for reception of uplink data and transmission of downlink data, and adaptation of resolution in frequency of the time/frequency resources. In terms of the number of scheduled terminal devices 600, in case of comparatively high utilization of the REC-RE interface 700, less terminal devices 600 can be scheduled. In terms of the number of layers that are scheduled for each terminal device 600 in DL, in case of comparatively high utilization of the REC-RE interface 700 less layers can be scheduled. In terms of the number of beams 500 that are scheduled for reception in UL, in case of comparatively high utilization of the REC-RE interface 700 less beams 500 can be scheduled. In terms of the amount of time/frequency resources used for transmission and reception (such as the number of subcarriers used for each TTI), in case of comparatively high utilization of the REC-RE interface 700 less time/frequency resources (subcarriers) can be used. In terms of adaptation of resolution in frequency of the time/frequency resources, to reduce the bit rate used for uplink transmission on the REC-RE interface 700, beam weights and spatial information can be expressed for a larger number of sub-carriers i.e., for a larger bandwidth, in case of comparatively high utilization of the REC-RE interface 700.

Reference is now made to FIG. 5 illustrating methods for prioritized transmission of uplink data as performed by the RE 300a, 300b according to further embodiments. It is assumed that steps S202, S206 are performed as described above with reference to FIG. 4 and a thus repeated description thereof is therefore omitted.

As disclosed above, in some aspects the instructions in step S106 are provided in an uplink control message, as is sent from the REC 200a to the RE 300a. Hence, according to an embodiment the instructions are in step S206 received in an uplink control message.

As disclosed above, in some aspects the instructions comprise a prioritization command relating to scheduling of the reception of the uplink data from terminal devices 600. The prioritization commands are to be applied at the RE 300a, 300b during reception of the uplink data. Hence, according to an embodiment the RE 300a is configured to perform step S204:

S204: The RE 300a schedules the reception of the uplink data from the terminal devices 600 in accordance with the prioritization command.

As disclosed above, in some aspects the instructions how the RE 300a, 300b is to prioritize received uplink data are provided to the RE 300a, 300b per TTI of the uplink data.

Further aspects and embodiments applicable to both the methods performed by the REC 200a and the RE 300a disclosed above will now be provided.

In a time division duplex (TDD) system, the UL samples are generated during a short time, namely during UL radio subframes. As disclosed above, the herein disclosed embodiments enable the REC-RE interface 700 to be dimensioned lower than the peak bit rate generated at the receiving radio interface. This can be accomplished by spreading out the transmission of uplink data on the REC-RE interface 700 also over the duration of the DL subframes. Further, the uplink data could be transmitted in an order which minimize the impact of the REC-RE interface 700 given that parallelized signal processing is used in the REC 200a.

Different ways to spread out the transmission of uplink data on the REC-RE interface 700 will now be disclosed.

According to a first example the transmission of uplink data on the REC-RE interface 700 is spread out by the RE 200a determining the priority of the users (terminal devices 600) and the measurements carried out during the UL subframe. This gives a first order. The priority of the users could depend on the service, e.g. end-to-end requirements. The priority of the users could depend on whether the user is going to be scheduled DL shortly after the prioritization determining is performed or not. Users not scheduled DL soon after can be given lower priority as result anyway would be on hold. The priority of the users could depend on whether the user is affecting another higher priority user or not, e.g. if interference cancellation is required. The priority of the users could depend on whether the uplink data of the user is requested by another access node.

According to a second example the transmission of uplink data on the REC-RE interface 700 is spread out by the RE 200a determining the priority of each set of samples for each user (terminal device 600). Demodulation reference symbols could be given higher priority than data samples to allow for the demodulation to start early. Processing of data in the RE 300a needed for processing in the REC 200a could be prioritized over processing of data not needed for processing in the REC 200a such that data needed for processing in the REC 200a could be transferred to the REC 200a over the REC-RE interface 700 before data not needed for processing in the REC 200a is transferred to the REC 200a over the REC-RE interface 700. Different beams 500 could be given different priority; the REC 200 could determine a minimal number of beams for the decoding and set higher priority of these beams. Measurement samples not needed for instant decoding, but rather for future link adaptation and beam shaping could be given low priority. By sending the demodulation symbols first for multiple users, the signal processing in the REC 200a can start calculating channel estimates in parallel. Typically, signal processing consists of a large set of processing units which can be subdivided to in parallel calculate channel estimates for the users.

Figure 7:
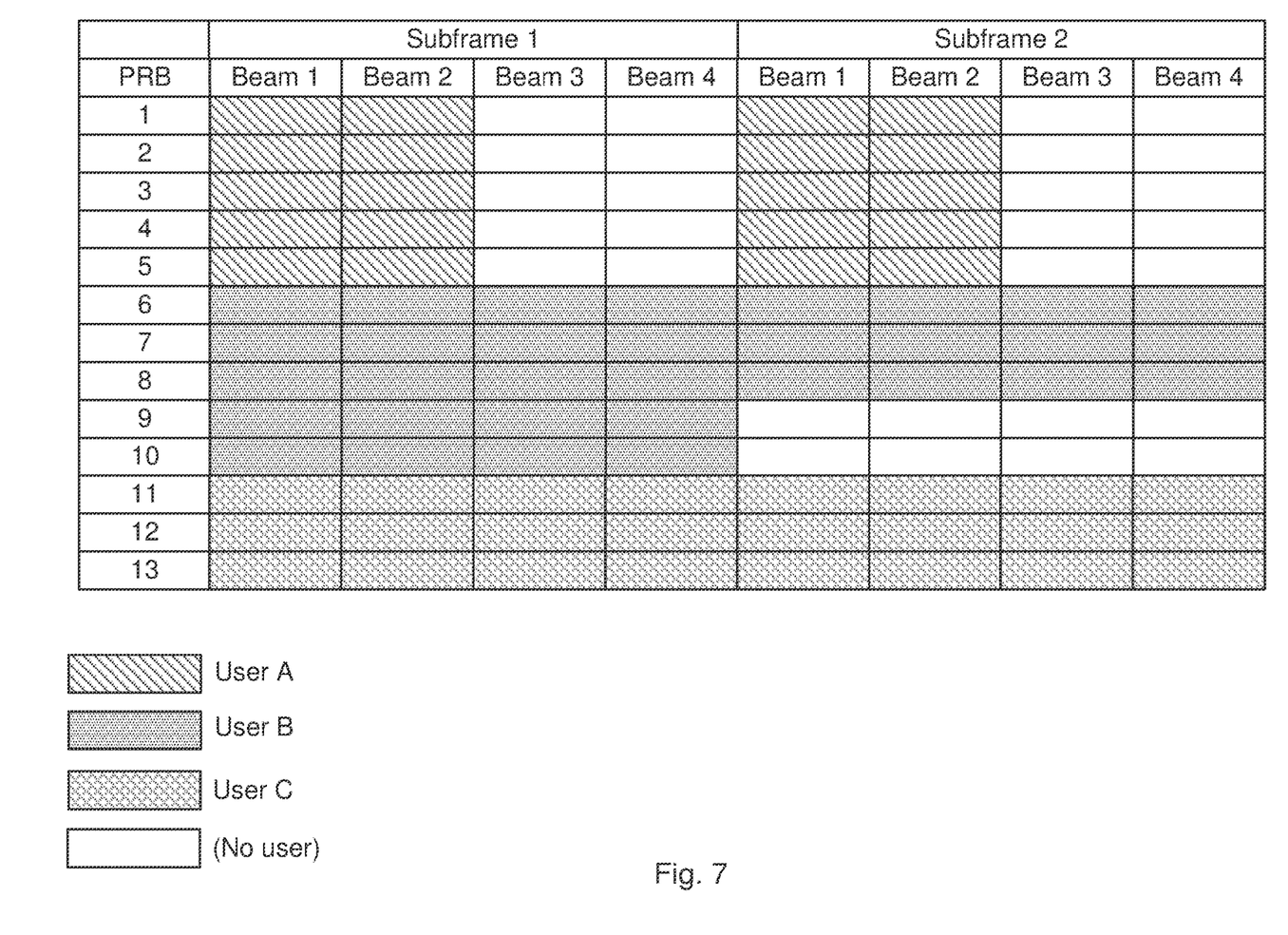
FIG. 7 is a schematic illustration of allocation of resources in a time/frequency grid according to embodiments.
Figure 8:
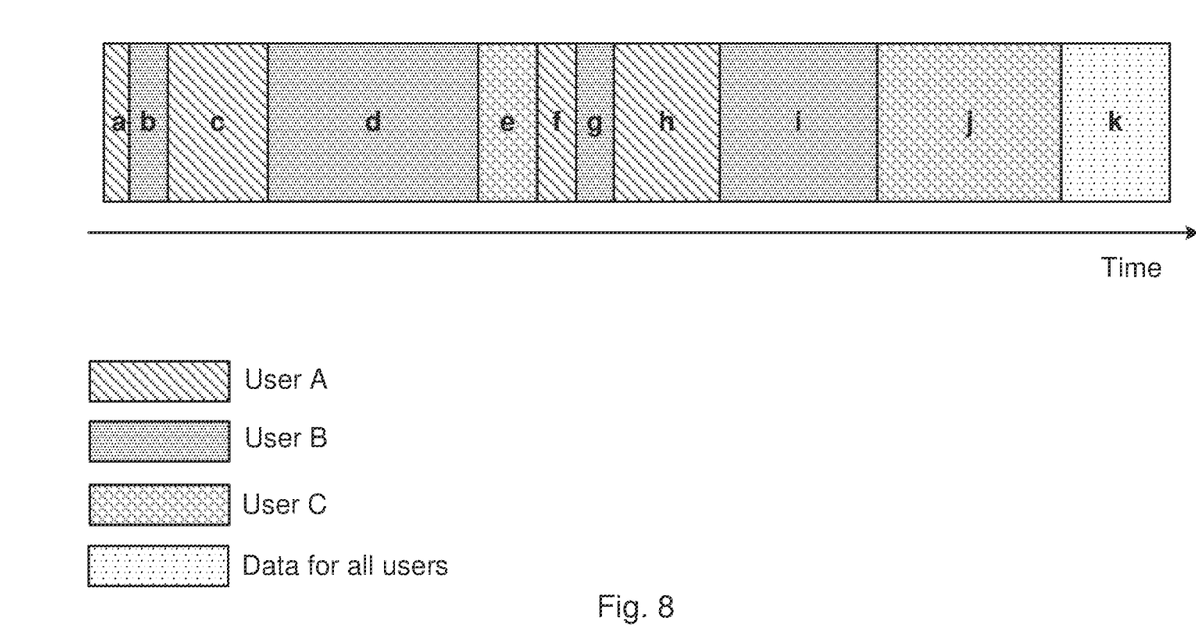
FIG. 8 is a schematic illustration of prioritized transmission order of uplink data according to embodiments.

FIGS. 7 and 8 show an example of the prioritization of uplink data. FIG. 7 illustrates allocation of resources in a time/frequency grid. The resources are provided in terms of physical resource blocks (PRBs; numbered "1" to "13" in FIG. 7) and subframes (denoted "Subframe 1" and "Subframe 2" in FIG. 7) where in each subframe the resources are allocated to a beam 500 (denoted "Beam 1", "Beam 2", "Beam 3", and "Beam 4" in FIG. 7).

Further, in the illustrative example of FIG. 7, uplink data for three users ("User A", "User B", and "User C") is allocated to the resources. "User A" uses two of the beams ("Beam 1" and "Beam 2") and is assumed to have highest priority. "User B" uses all of the beams and a different number of PRBs in the two subframes and is assumed to have middle priority. "User C" uses all of the beams and is assumed to have lowest priority.

FIG. 8 illustrates the resulting order "a" to "k" in which the data allocated to the users in FIG. 7 is to be transmitted on the REC-RE interface 700, where the data in "a" to "k" is given according to Table 1:

TABLE 1

Transmission order of uplink data according to FIG. 8

| | |
|---|---|
| a | Reference symbols for "User A" |
| b | Reference symbols for "User B" |
| c | Data symbols for "User A" |
| d | Data symbols for "User B" |
| e | First part of reference and data symbols for "User C" from "Subframe 1". Not all reference and data symbols is transferred as "User C" has lowest priority and must accept a longer latency |
| f | Reference symbols for "User A" |
| g | Reference symbols for "User B" |
| h | Data symbols for "User A" |
| i | Data symbols for "User B" |
| j | Second part of reference and data symbols for "User C" from "Subframe 1" and reference and data symbols for "User C" from "Subframe 2" |
| k | Measurement data for all user, such as additional samples, channel estimates, SRS measurements, etc. |

Figure 9:
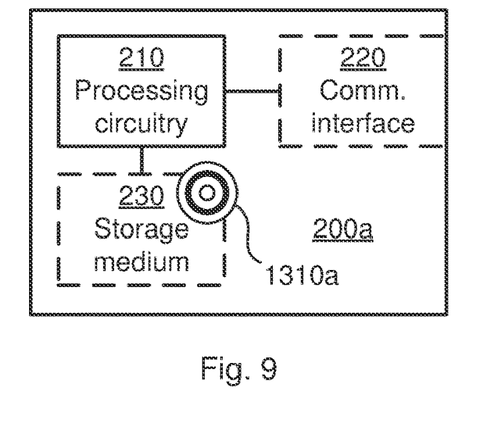
FIG. 9 is a schematic diagram showing functional units of a radio equipment controller according to an embodiment.

FIG. 9 schematically illustrates, in terms of a number of functional units, the components of an REC 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the REC 200a to perform a set of operations, or steps, S102-S106, as disclosed above. For example, the storage medium 230 may store the set of operations, and the processing circuitry 210 may be configured to retrieve the set of operations from the storage medium 230 to cause the REC 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The REC 200a further comprises a communications interface 220 for communications with other entities of the access node 100, such as another REC 200b and one or more REs 300a, 300b. As such the communications interface 220 may comprise one or more transmitters and receivers, comprising analogue and digital components. The communications interface 220 is operatively connected to the REC-RE interface 700.

The processing circuitry 210 controls the general operation of the REC 200a e.g. by sending data and control signals to the communications interface 220 and the storage medium 230, by receiving data and reports from the communications interface 220, and by retrieving data and instructions from the storage medium 230. Other components, as well as the related functionality, of the REC 200a are omitted in order not to obscure the concepts presented herein.

Figure 10:
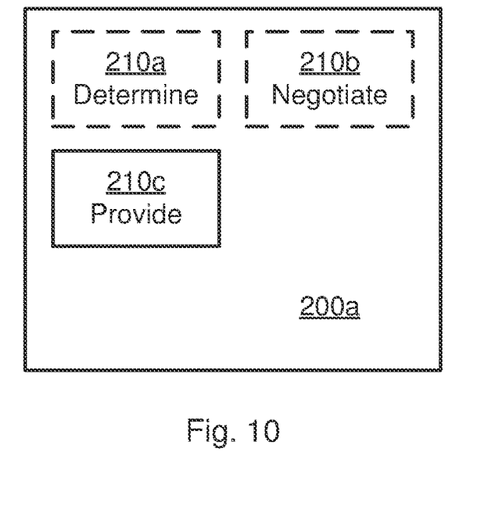
FIG. 10 is a schematic diagram showing functional modules of a radio equipment controller according to an embodiment.

FIG. 10 schematically illustrates, in terms of a number of functional modules, the components of an REC 200a according to an embodiment. The REC 200a of FIG. 10 comprises a provide module 210c configured to perform step S106. The REC 200a of FIG. 10 may further comprise a number of optional functional modules, such as any of a determine module 210a configured to perform step S102, and a negotiate module 210b configured to perform step S104. In general terms, each functional module 210a-210c may be implemented in hardware or in software. Preferably, one or more or all functional modules 210a-210c may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210c and to execute these instructions, thereby performing any steps of the REC 200a as disclosed herein.

Figure 11:
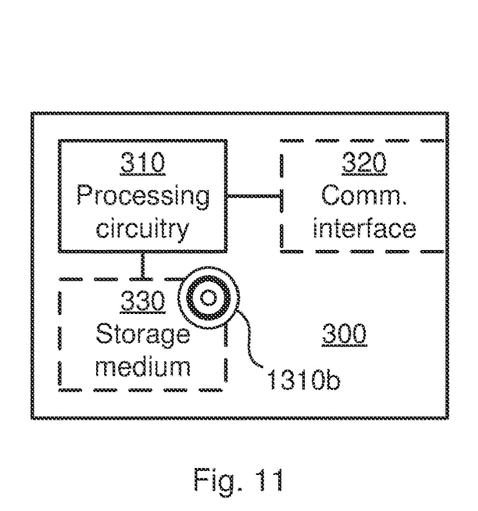
FIG. 11 is a schematic diagram showing functional units of a radio equipment according to an embodiment.

FIG. 11 schematically illustrates, in terms of a number of functional units, the components of an RE 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310b (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the RE 300a, 300b to perform a set of operations, or steps, S202-S206, as disclosed above. For example, the storage medium 330 may store the set of operations, and the processing circuitry 310 may be configured to retrieve the set of operations from the storage medium 330 to cause the RE 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The RE 300a, 300b further comprises a communications interface 320 for communications other entities of the access node 100, such as one or more RECs 200a, 200b. As such the communications interface 320 may comprise one or more transmitters and receivers, comprising analogue and digital components. The communications interface 320 is operatively connected to the REC-RE interface 700.

The processing circuitry 310 controls the general operation of the RE 300a, 300b e.g. by sending data and control signals to the communications interface 320 and the storage medium 330, by receiving data and reports from the communications interface 320, and by retrieving data and instructions from the storage medium 330. Other components, as well as the related functionality, of the RE 300a, 300b are omitted in order not to obscure the concepts presented herein.

Figure 12:
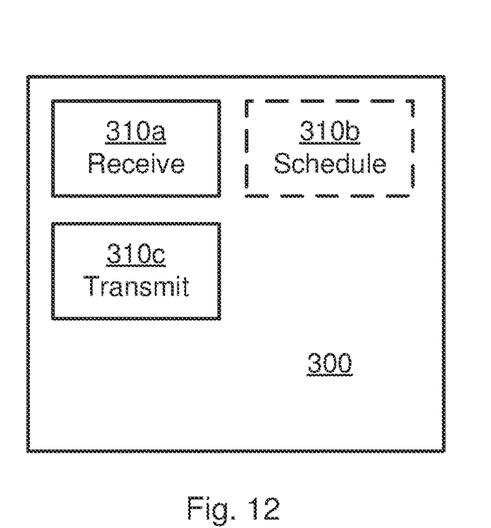
FIG. 12 is a schematic diagram showing functional modules of a radio equipment according to an embodiment.

FIG. 12 schematically illustrates, in terms of a number of functional modules, the components of an RE 300a, 300b according to an embodiment. The RE 300a, 300b of FIG. 12 comprises a number of functional modules; a receive module 310a configured to perform step S210 and a transmit module 310c configured to perform step S206. The RE 300a, 300b of FIG. 12 may further comprise a number of optional functional modules, such as a schedule module 310b configured to perform step S204. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the RE 300a, 300b as disclosed herein.

The RE and REC may be provided as standalone devices or as a part of at least one further device. For example, as disclosed above the RE and REC may be provided in an access node. Alternatively, functionality of the RE and the REC may be distributed between at least two devices, or nodes.

Thus, a first portion of the instructions performed by the RE or REC may be executed in a first device, and a second portion of the of the instructions performed by the RE or REC may be executed in a second device; the herein disclosed embodiments are not limited to any particular number of devices on which the instructions performed by the RE or REC may be executed. Hence, the methods according to the herein disclosed embodiments are suitable to be performed by an RE or REC residing in a cloud computational environment. Therefore, although a single processing circuitry 210, 310 is illustrated in FIGS. 9 and 11 the processing circuitry 210, 310 may be distributed among a plurality of devices, or nodes. The same applies to the functional modules 210a-210c, 310a-310c of FIGS. 10 and 12 and the computer programs 1320a, 1320b of FIG. 13 (see below).

Figure 13:
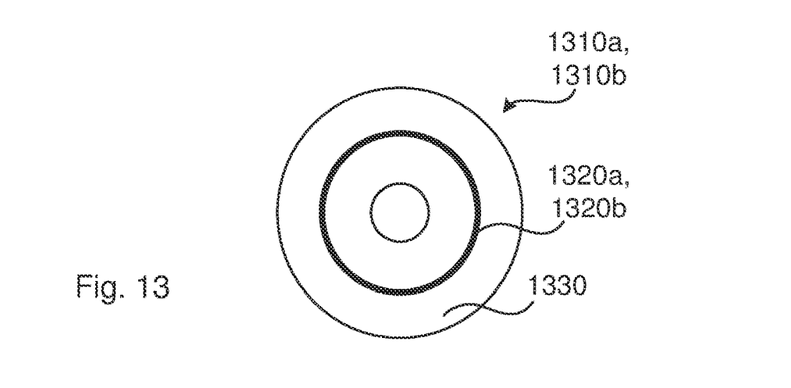
FIG. 13 shows one example of a computer program product comprising computer readable means according to an embodiment.

FIG. 13 shows one example of a computer program product 1310a, 1310b comprising computer readable means 1330. On this computer readable means 1330, a computer program 1320a can be stored, which computer program 1320a can cause the processing circuitry 210 and thereto operatively coupled entities and devices, such as the communications interface 220 and the storage medium 230, to execute methods according to embodiments described herein. The computer program 1320a and/or computer program product 1310a may thus provide means for performing any steps of the REC 200a as herein disclosed. On this computer readable means 1330, a computer program 1320b can be stored, which computer program 1320b can cause the processing circuitry 310 and thereto operatively coupled entities and devices, such as the communications interface 320 and the storage medium 330, to execute methods according to embodiments described herein. The computer program 1320b and/or computer program product 1310b may thus provide means for performing any steps of the RE 300a, 300b as herein disclosed.

In the example of FIG. 13, the computer program product 1310a, 1310b is illustrated as an optical disc, such as a CD (compact disc) or a DVD (digital versatile disc) or a Blu-Ray disc. The computer program product 1310a, 1310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b is here schematically shown as a track on the depicted optical disk, the computer program 1320a, 1320b can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method for configuring transmission order of uplink data, the method performed by a radio equipment ("RE") of an access node, the RE having a RE controller ("REC")-RE interface that communicatively couples the RE with a REC of the access node, the method comprising:
receiving instructions from the REC that indicate a scheduling prioritization for transmission by the RE of uplink data between the RE and the REC over the REC-RE interface, the uplink data being received by the RE on the radio interface; and
transmitting the uplink data on the REC-RE interface according to the instructions, resulting in the scheduling prioritization of the uplink data.

2. The method of claim 1, wherein the instructions comprise instructions corresponding to prioritization per terminal device and/or beam from which the uplink data is received by the RE.

3. The method of claim 1, wherein the instructions comprise instructions to cause reference symbols in the uplink data to be prioritized over other types of uplink data.

4. The method of claim 1, wherein the instructions comprise instructions to prioritize transmission of user data relative to transmission of measurement data.

5. The method of claim 1, wherein the instructions comprise instructions to cause the RE to prioritize transmission of a first measurement data of a first radio propagation channel higher than transmission of a second measurement data of a second radio propagation channel.

6. The method of claim 1, wherein the instructions are based on a bit rate capacity of the REC-RE interface.

7. The method of claim 1, wherein receiving the instructions comprises receiving an uplink control message comprising the instructions.

8. The method of claim 1, wherein receiving the instructions comprises receiving a prioritization command relating to scheduling of the reception of the uplink data from terminal devices, wherein the prioritization commands are to be applied at the RE during reception of the uplink data, the method further comprising:
scheduling the reception of the uplink data from the terminal devices in accordance with the prioritization command.

9. The method of claim 1, wherein receiving the instructions comprises receiving instructions per transmission time interval of the uplink data.

10. A radio equipment ("RE") of an access node, the RE having a RE controller ("REC")-RE interface that communicatively couples the RE with a REC of the access node, the RE comprising:
processing circuitry; and
memory coupled to the processing circuitry and having instructions stored therein that are executable by the processing circuitry to cause the RE to perform operations comprising:
receiving instructions from the REC that indicate a scheduling prioritization for transmission by the RE of uplink data between the RE and the REC over the REC-RE interface, the uplink data being received by the RE on the radio interface; and
transmitting the uplink data on the REC-RE interface according to the instructions, resulting in the scheduling prioritization of the uplink data.

11. The RE of claim 10, wherein the instructions comprise instructions corresponding to prioritization per terminal device and/or beam from which the uplink data is received by the RE.

12. The RE of claim 10, wherein the instructions comprise instructions to cause reference symbols in the uplink data to be prioritized over other types of uplink data.

13. The RE of claim 10, wherein the instructions comprise instructions to prioritize transmission of user data relative to transmission of measurement data.

14. The RE of claim 10, wherein the instructions comprise instructions to cause the RE to prioritize transmission of a first measurement data of a first radio propagation channel higher than transmission of a second measurement data of a second radio propagation channel.

15. The RE of claim 10, wherein the instructions are based on a bit rate capacity of the REC-RE interface.

16. The RE of claim 10, wherein receiving the instructions comprises receiving an uplink control message comprising the instructions.

17. The RE of claim 10, wherein receiving the instructions comprises receiving a prioritization command relating to scheduling of the reception of the uplink data from terminal devices, wherein the prioritization commands are to be applied at the RE during reception of the uplink data, the operations further comprising:

scheduling the reception of the uplink data from the terminal devices in accordance with the prioritization command.

18. The RE of claim 10, wherein receiving the instructions comprises receiving instructions per transmission time interval of the uplink data.

19. A non-transitory computer-readable medium comprising computer-readable instructions which, when executed by a processor of a radio equipment ("RE") of an access node, causes the RE to perform operations, wherein the RE has a RE controller ("REC")-RE interface that communicatively couples the RE with a REC of the access node, the operations comprising:

receiving instructions from the REC that indicate a scheduling prioritization for transmission by the RE of uplink data between the RE and the REC over the REC-RE interface, the uplink data being received by the RE on the radio interface; and     transmitting the uplink data on the REC-RE interface according to the instructions, resulting in the scheduling prioritization of the uplink data.

20. The non-transitory computer-readable medium of claim 19, wherein the instructions comprise at least one of:

instructions corresponding to prioritization per terminal device and/or beam from which the uplink data is received by the RE;

instructions to cause reference symbols in the uplink data to be prioritized over other types of uplink data;

instructions to prioritize transmission of user data relative to transmission of measurement data; and     instructions to cause the RE to prioritize transmission of a first measurement data of a first radio propagation channel higher than transmission of a second measurement data of a second radio propagation channel.

\* \* \* \* \*